(12) United States Patent
Gilsdorf et al.

(10) Patent No.: US 6,332,624 B1
(45) Date of Patent: Dec. 25, 2001

(54) AIR-SUSPENSION SYSTEM

(75) Inventors: Joachim Gilsdorf, Donnersdorf; Winfried Herold, Kitzingen/Repperndorf, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/526,767

(22) Filed: Mar. 16, 2000

(30) Foreign Application Priority Data

Mar. 16, 1999 (DE) ............................................. 199 11 565
Jan. 25, 2000 (DE) ............................................. 100 03 045

(51) Int. Cl.$^7$ ................................................. B60G 17/048
(52) U.S. Cl. .................................. 280/124.16; 280/5.515; 267/64.21
(58) Field of Search ....................... 280/124.157, 124.16, 280/5.515, 5.516, 124.161; 267/64.17, 64.18, 64.19, 64.21, 122, 123, DIG. 1, DIG. 2

(56) References Cited

U.S. PATENT DOCUMENTS

| | | | | |
|---|---|---|---|---|
| 3,000,624 | * | 9/1961 | Cislo | 267/64.24 |
| 3,372,919 | * | 3/1968 | Jackson | 267/64.21 |
| 3,887,174 | * | 6/1975 | Whelan et al. | 267/64.16 |
| 4,648,621 | * | 3/1987 | Yokoya et al. | 280/6.157 |
| 5,649,692 | * | 7/1997 | Gilsdorf et al. | 267/64.21 |

FOREIGN PATENT DOCUMENTS

| | | | |
|---|---|---|---|
| 33 47 435 | 7/1985 | (DE) | B60G/17/04 |
| 34 27 902 | 2/1986 | (DE) | B60G/17/04 |
| 44 09 252 | 4/1997 | (DE) | B60G/17/048 |

* cited by examiner

Primary Examiner—J. J. Swann
Assistant Examiner—David R. Dunn
(74) Attorney, Agent, or Firm—Cohen, Pontani, Lieberman & Pavane

(57) ABSTRACT

An air-suspension system has at least one air spring arranged between a chassis and a vehicle component mounted relative to said chassis for movement along an oscillatory path. A control valve is arranged inside the air spring and has control positions for feeding, blocking and discharging compressed air in the air spring. The control valve is activated via a control element also arranged inside the air spring. A guideway of the control element acts on one of an outer tube air-spring subassembly and a rolling tube air-spring subassembly which are movable relative to one another. The control valve is designed as a rotary-slide valve and is activated via the guideway and a rotary-slide valve body. The guideway of the control element is shorter than the stroke length of the air spring, the one of the subassemblies which actuates the control element being in releasable operative connection with the control element. The releasable operative connection is restricted only to a section of the stroke travel between the two air-spring subassemblies of outer tube or rolling tube.

7 Claims, 6 Drawing Sheets

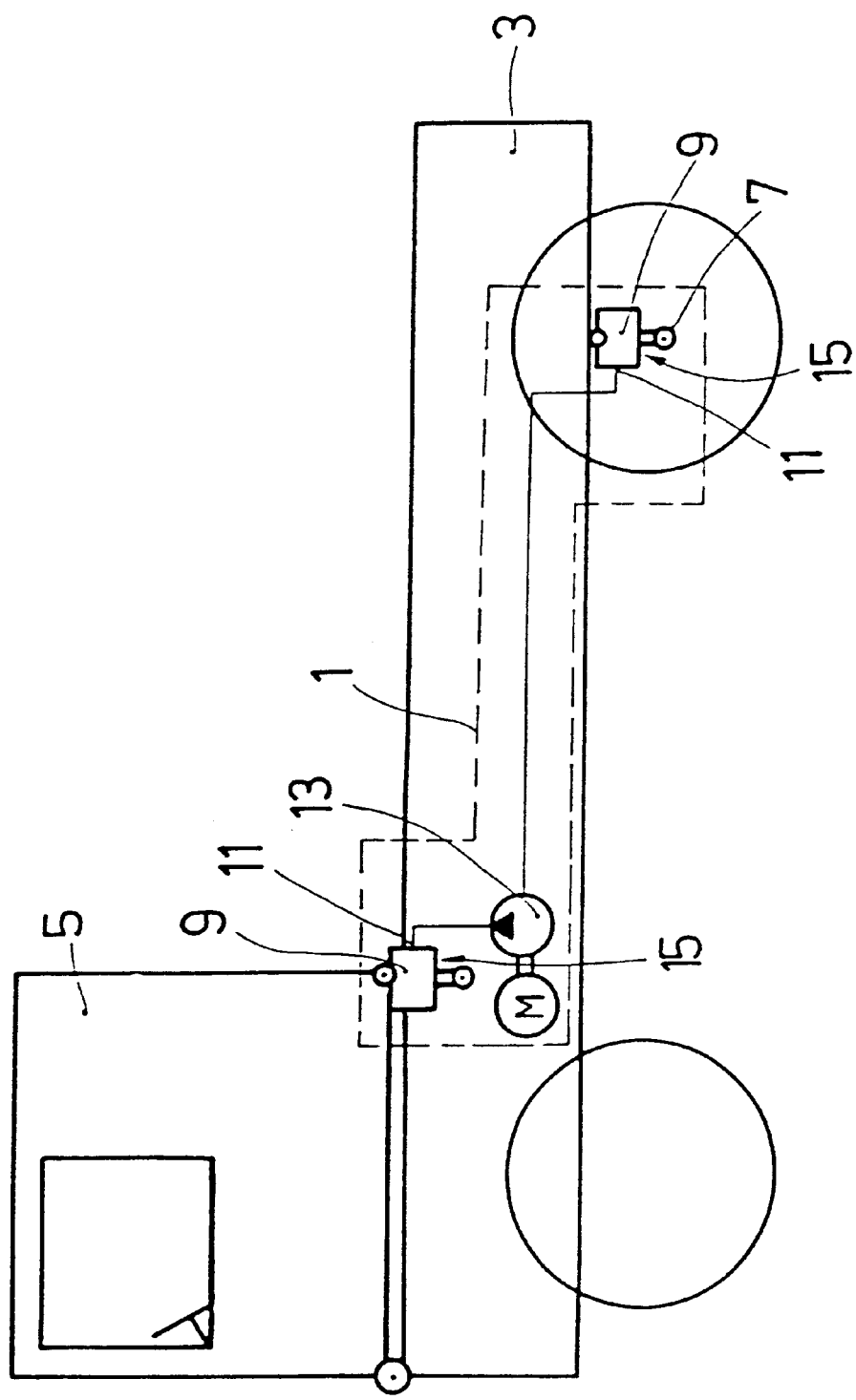

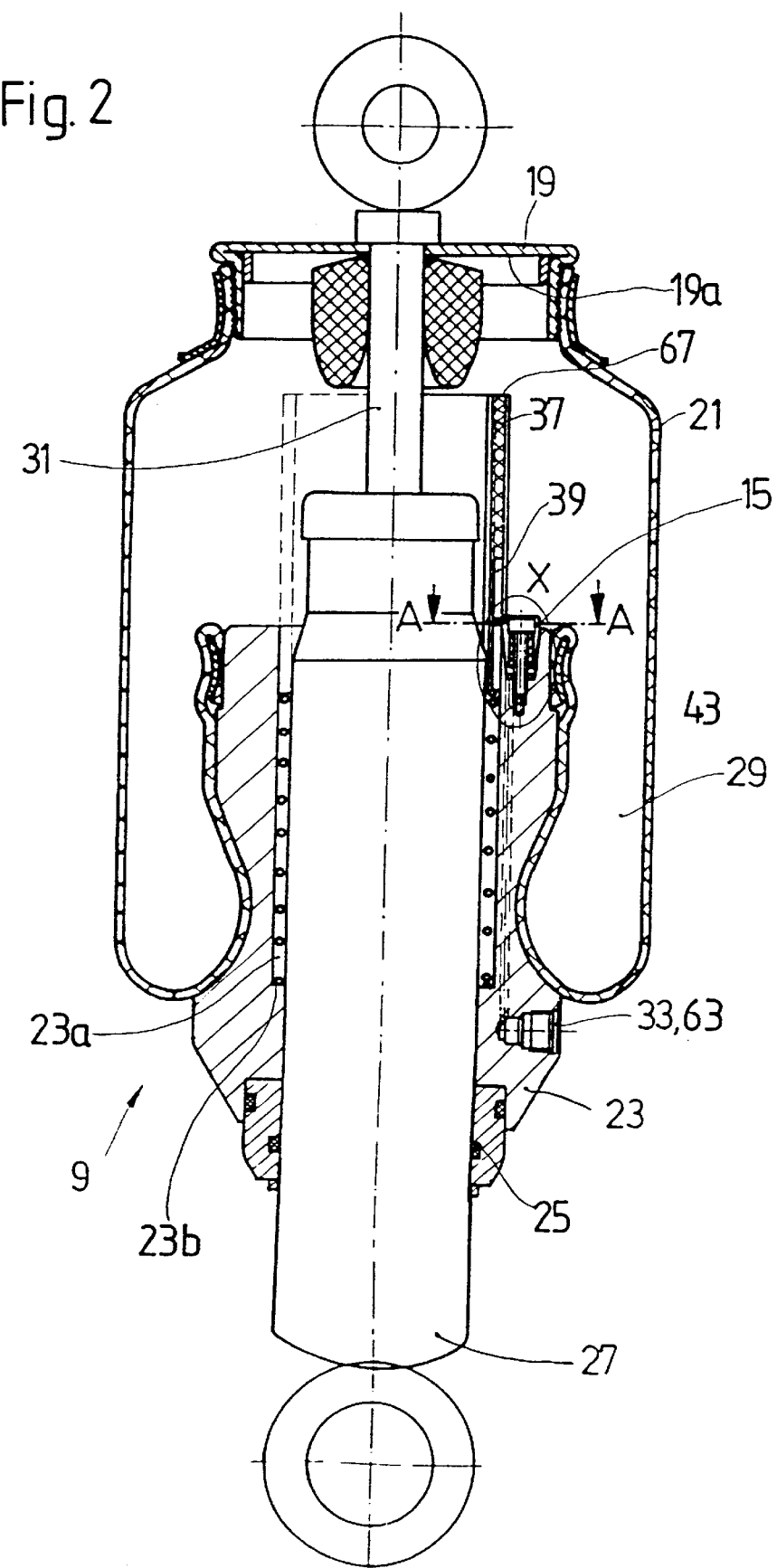

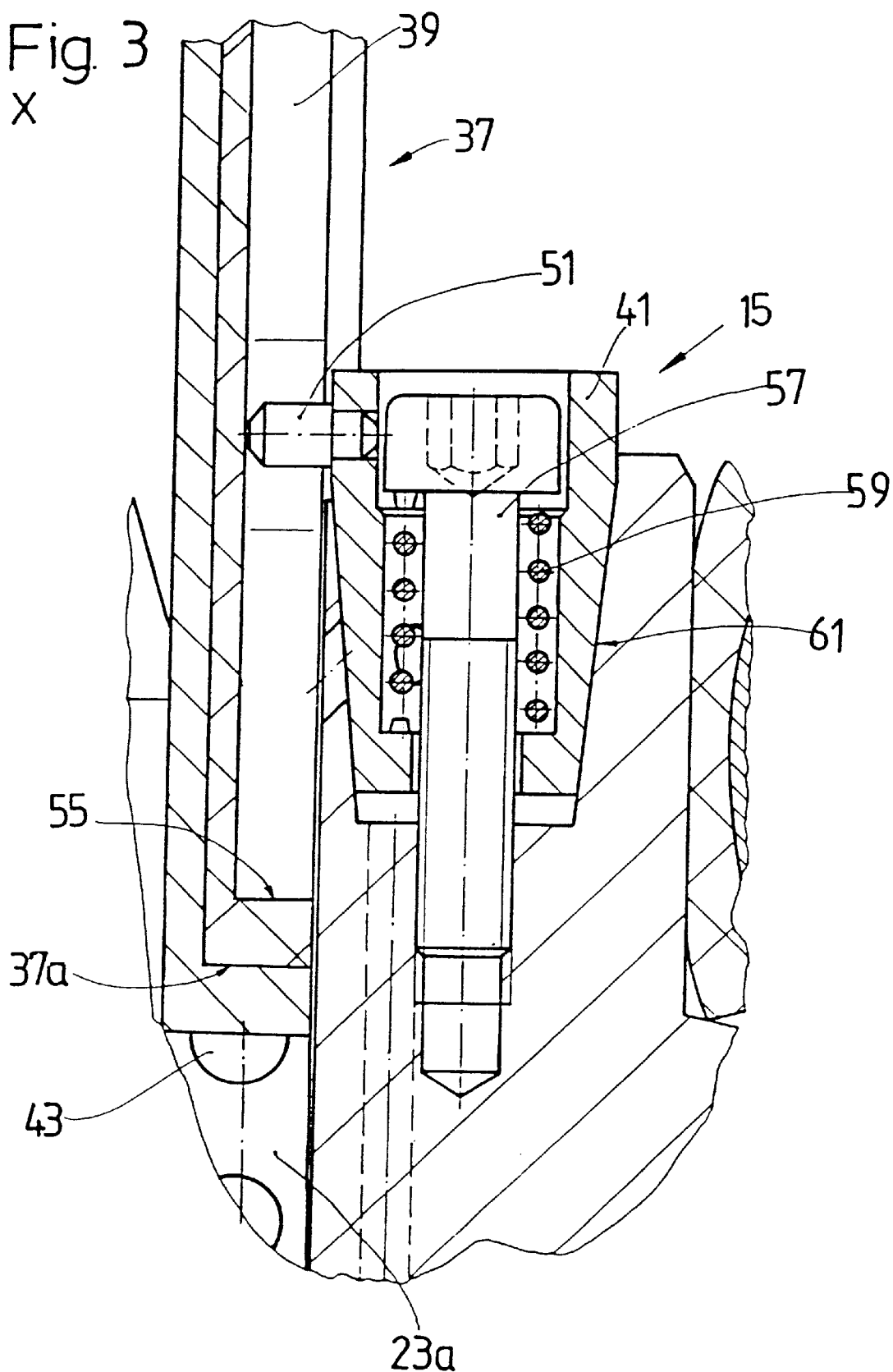

A-A

AIR-SUSPENSION SYSTEM

BACKGROUND OF THE INVENTION

1. Field of the Invention

The invention relates to an air-suspension system having at least one air spring for installation between a chassis and a vehicle component mounted for oscillating along an oscillatory path relative to the chassis, the air spring having a control valve for feeding, blocking, or discharging compressed air in the air spring.

2. Description of the Related Art

An air suspension system is disclosed, for example, in German reference DE 33 47 435 A1 having an air spring connectable between a chassis of a vehicle and a vehicle component mounted for oscillating along an oscillation path relative to the chassis. A control valve is arranged for feeding, blocking, or discharging compressed air in the air spring. A basic problem with the disclosed system is that it is difficult to fit and adjust the control valve or a actuating device for the control valve so that a certain switching position of the control valve is set as a function of a loading state or a stroke position of the air spring.

Additional construction space and fitting material (i.e., holders, linkages, screws, etc.) are required for fitting the external level control valve.

During the fitting of the control valve, the vehicle component mounted for oscillating is put into a defined position relative to the chassis and an adjustment of the actuating device is made in this position. However, this sequence of work is difficult to integrate in an assembly line production.

Furthermore, the operability of the external level control valve and thus of the vehicle may be impaired by dirt or moisture when using an air-sprung vehicle in difficult terrain.

Another air-suspension system for a motor vehicle is disclosed in German reference DE 34 27 902 A1 having at least one air spring between a chassis and a vehicle component mounted for oscillating along an oscillatory path relative to the chassis. This reference also has a control valve for feeding and discharging compressed air inside the air spring, wherein the control valve is activated via an actuating device which is likewise arranged inside the air spring.

Yet another air-suspension system for a motor vehicle is disclosed in German reference DE 44 09 252 C2 with at least one air spring arranged between a chassis and a vehicle component mounted for oscillating movement along an oscillatory path relative to the chassis and a control valve arranged inside the air spring. The control valve has control positions for feeding, blocking and discharging compressed air and is activated via a control element which is likewise arranged inside the air spring. A guideway of the control valve acts on one of the two air-spring subassemblies of the outer tube and the rolling tube which are movable relative to one another. This control valve is designed as a rotary-slide valve activated via the guideway and a rotary-slide valve body. In the embodiment according to FIGS. 6 and 7 of this reference, the control element is firmly connected to the outer tube. The result of this control element arrangement is that the entire length of the control element has to be accommodated inside the air spring. Consequently, the rolling tube must be arranged relatively close to the base of the vibration damper which restricts the heat exchange between the vibration damper and the surroundings.

SUMMARY OF THE INVENTION

The object of the present invention is to develop an air-suspension system in such a way that the fitting and adjustment work for a control valve is simplified, the operability of the air-suspension system is ensured even under adverse circumstances and the construction cost and amount of construction space of the system are at least reduced with respect to the prior art.

The object is achieved according to the present invention by an air-suspension system for use in a motor vehicle having a chassis and a vehicle component operatively mounted for moving along an oscillatory path relative to the chassis, wherein the air suspension system comprises an air spring connectable between the chassis and the vehicle component. The air spring has an outer tube air-spring subassembly and a rolling tube air-spring subassembly movable relative to the outer tube air-spring subassembly along a stroke length. A control valve is arranged inside the air-spring and has a compressed-air feed connection and a discharge connection. The control valve is selectively actuatable to a discharge position for discharging compressed air from the air spring via the discharge connection, a feed position for feeding compressed air to the air spring via the compressed-air feed connection, and a block position for blocking the flow of compressed air to and from the air spring. The inventive air-suspension system further comprises a control element operatively arranged in the air spring for actuating the control valve in response to a relative position of the rolling tube air-spring subassembly and the outer tube air-spring tube assembly. The control element has an effective length that is shorter than the stroke length of the air spring. Furthermore, the control element is in a releasable operative connection with one of the rolling tube air-spring subassembly and the outer tube air-spring subassembly, the releasable operative connection being limited to a portion of the stroke length of said air spring.

The control element has a guideway that is shorter than the stroke length of the air spring. The one of the rolling tube air-spring subassembly and the outer tube air-spring subassembly in releasable operative connection with the control element actuates the control element, wherein the releasable operative connection being restricted only to a section of the stroke travel between the outer tube air-spring subassembly and the rolling tube air-spring subassembly.

The great advantage of the inventive design lies in the fact that the position of the rolling tube may be shifted toward the top end of the vibration damper due to the restricted axial overall length of the rolling tube. Accordingly, the vibration damper has a larger contact area with the surrounding air facilitating heat dissipation. Furthermore, the mass of the control element is reduced because of the shortened overall length relative to the prior art.

The releasable connection between the one of the outer tube air-spring subassembly and the rolling tube air-spring subassembly is formed by contact surfaces in each case on the control element and the one of the outer tube air-spring subassembly and the rolling tube air spring subassembly.

In a further embodiment, the control element is arranged in an axially floating manner inside the rolling tube. If the rotary-slide valve and the control element are arranged in the rolling tube, the setting operation required by the prior art may be eliminated.

Thus the spring element may be arranged between the control element and a supporting surface of the rolling tube. One end position of the control element is supported axially on the rotary-slide valve. Accordingly, the control element is prevented from vibrating uncontrollably in the axial direction during a spring deflection action. The end position may also be implemented via a stop independently of the rotary-slide valve, but the components would then be more complicated. The axial support via the rotary-slide valve allows a simple axial fitting to be maintained.

Furthermore, the control element has an anti-rotation locking means in the circumferential direction. The purpose of the anti-rotation locking means is to prevent an uncontrolled rotary movement of the control element from occurring, which could impair the control action.

In addition to being designed as a simple control rod, the control element may optionally be designed as a cylinder. A cylindrical control element has the advantage that relatively high strength is obtained solely on account of the geometrical form.

In this case, the control element has a pocket-shaped recess in which the guideway is arranged. Alternatively, the guideway may also be made in one piece with the control element. This optional embodiment is especially suitable if the control element comprises a plastic piece produced in larger quantities.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views:

FIG. 1 is a schematic diagram showing an air-suspension system according to an embodiment of the present invention;

FIG. 2 is a sectional view of an air spring of the air suspension system of FIG. 1 with rotary-slide control valve according to an embodiment of the present invention;

FIG. 3 is a more detailed sectional view of the area X of the control element in FIG. 2;

DETAILED DESCRIPTION OF THE PRESENTLY PREFERRED EMBODIMENTS

Figure 5:
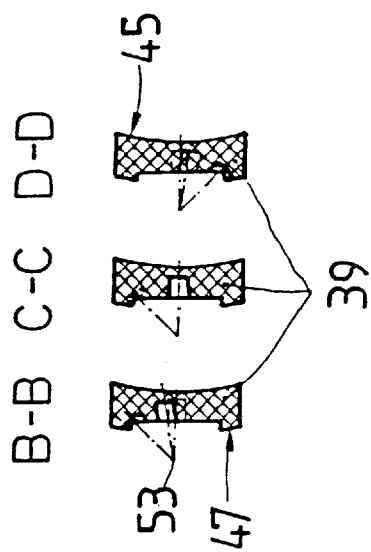
FIG. 5a–c are sectional views Va—Va, Vb—Vb, Vc—Vc of the control element of FIG. 4.

FIG. 1 shows an installation arrangement for an air-suspension system 1 between a chassis 3 and a vehicle component such as, for example, a driver's cab 5 or a vehicle axle 7 mounted for movement along an oscillatory path relative to the chassis 3. At least one air spring 9 is connected to a pressure source 13 via a supply connection 11 via a control valve 15, the control valve 15 being part of the air spring 9. The supply may be effected by a compressor unit.

The air spring 9 is shown in FIG. 2 and comprises a piston rod 31 axially movably mounted in a reservoir tube 27. An outer tube 19 is connected to the piston rod 31 and is also fastened to one end of a spring bellows 21. The other end of the spring bellows 21 is clamped in place on a rolling tube 23 which is mounted on the reservoir tube 27 and sealed off from the reservoir tube 27 by seals 25. A spring space 29 which is pressurized is defied by the outer tube 19 and the spring bellows 21 which is sealed relative to the reservoir tube 27.

As stated above, the piston rod 31 is in operative connection with the outer tube 19 and together with the reservoir tube 27 is an integral part of a vibration damper. The air spring 9 thus consists of two air-spring subassemblies moving relative to one another. A first air-spring subassembly 100 comprises the outer tube 19 and the piston rod 31. Accordingly, the first air-spring subassembly 100 may be referred to as an outer tube air-spring subassembly. Attachments such as a buffer may optionally be added as part of the first air-spring assembly. A second air-spring subassembly 101 comprises the rolling tube 23 and the reservoir tube 27 and the parts which may be fastened to these components. The second air-spring subassembly 101 may be referred to as a rolling tube air-spring subassembly.

Arranged inside the rolling tube 23 is a supply connection 33 which is in communication with a compressed-air feed line 35 for the control valve 15. The compressed-air feed line 35 opens out in the spring space 29 via the control valve 15 such that the control valve 15 influences the compressed-air feed from the outlet of the compressed-air feed line 35 into the spring space 29.

Figure 4:
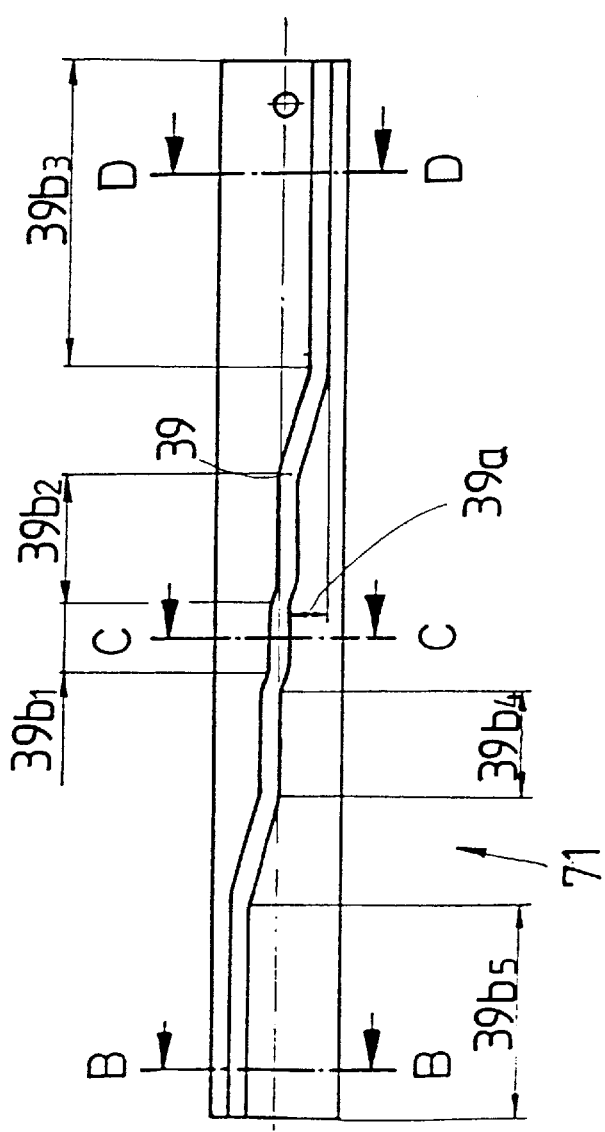
FIG. 4 is a front view of a control element with a guideway according to an embodiment of the present invention.

Referring now also to FIG. 3, which is a detailed view of the area X of the air spring 9 according to FIG. 2, the rolling tube 23 comprises an annular space 23a in which a control element 37 is arranged. FIG. 4 shows that the control element 37 has a guideway 39. Starting from a reference point 102 shown in FIG. 4, the guideway 39 has a gate 39' with a radial offset which varies along the circumferential direction along its axial course, relative to the longitudinal axis of the air spring 9. The control element 37 may comprise a rod or strip shape or also, as indicated by the broken lines in FIG. 2, a cylinder. The control element 37 has a pocket-shaped recess 37a for receiving the guideway 39. As an alternative, the guideway 39 may also be made as one piece with the control element 37. The guideway 39 interacts with a rotary-slide valve body 41 (see FIG. 3). The radial offset 39a of the gate 39' leads to a rotary movement of the rotary-slide valve body 41 via engagement of the rotary-slide valve body 41 with the guideway 39 during an axial translatory relative movement of the guideway 39 starting from the reference point 102. The control element 37 is arranged so that it floats in the longitudinal direction and is supported in the process on a spring element 43 which in turn bears against a supporting surface 23b of the rolling tube 23.

Figure 6:
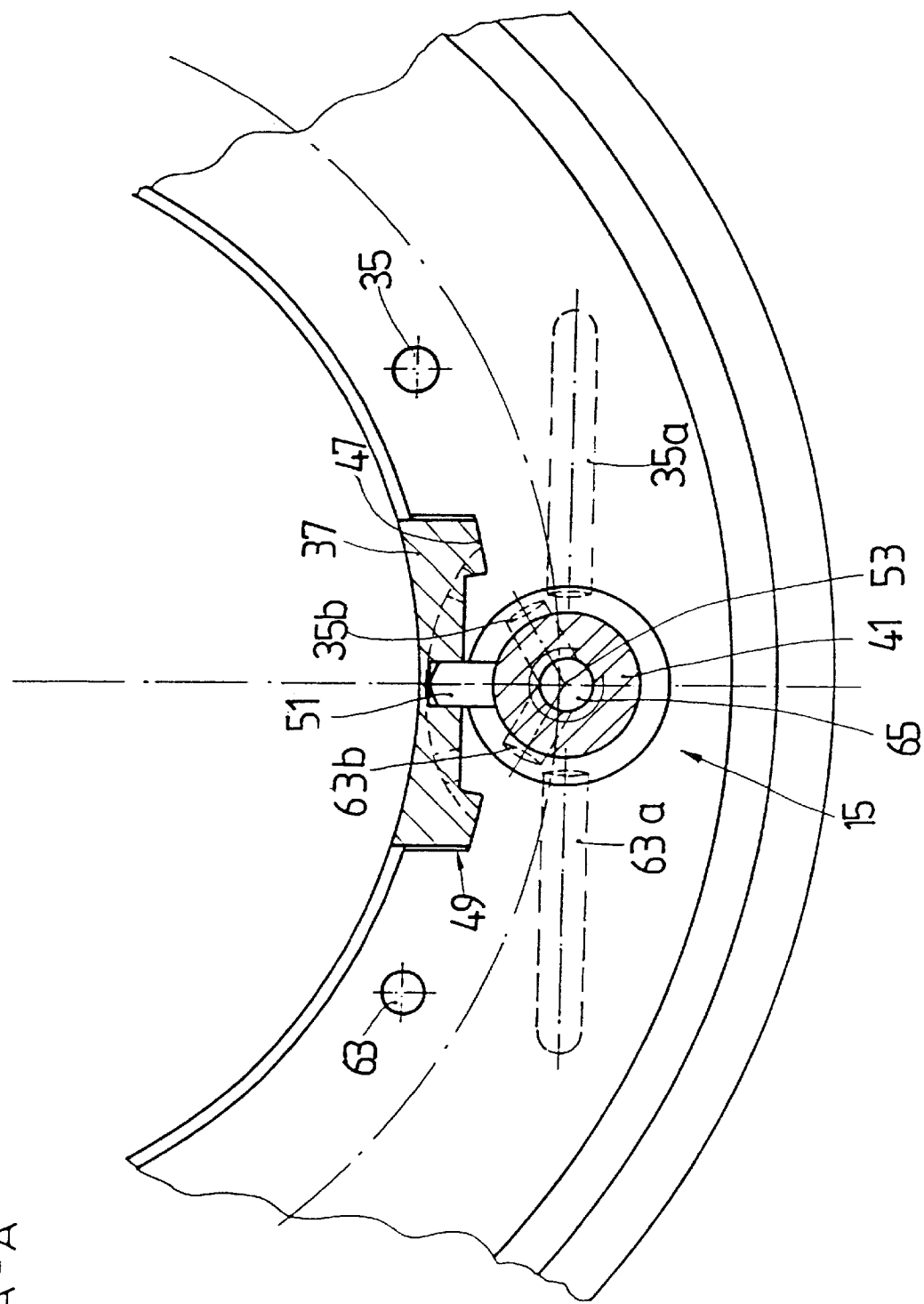
FIG. 6 is a partial sectional plan view of the air spring of FIG. 3 along line VI—VI.

Furthermore, the radial inward side of the control element 37 has a contour 45 adapted to the external surface of the reservoir tube 27. Referring to FIG. 6, guide strips 47 are arranged on the control element 37 which engage in a corresponding mating contour 49 (FIG. 6) of the rolling tube 23. The guide strips 47 and mating contour 49 comprise an anti-rotation locking means which prevents relative rotation movements of the control element 37 with respect to the rotary-slide valve body 41.

The gate 39' of the guideway 39 receives a transmission pin 51 of the rotary-slide valve body 41. The gate 39' is divided into longitudinal sections $39b_1$, $39b_2$, $39b_3$, $39b_4$, and $39b_5$ and is made centrally relative to the center of rotation 53 of the rotary-slide valve body 41 to ensure a reliable kinematic rotation on the one hand and to avoid any jamming forces on the other hand. That is, the open end of gate 39' which faces the rotary-slide valve body 41 always faces the center of rotation 53. Furthermore, the guideway 39 has a supporting surface 55 at the lower longitudinal end, so that an end position of the control element 37 is defined via the transmission pin 51 in connection with the spring element 43.

FIG. 3 shows the rotary-slide valve body 41 as it engages in the gate 39' of the guideway 39. The rotary-slide valve body 41 is designed to be rotatable in a conical outer surface 61 by a retaining screw 57 in combination with a retaining spring 59. The special shape of the outer surface 61 simplifies the sealing. The control valve also has a discharge line 63 in addition to the compressed-air feed line 35. The discharge and compressed-air feed lines 63, 35 may be brought into engagement with the control valve 15 via associated branch lines 35a, 63a (see FIG. 6). The rotary-slide valve body 41 has two control passages 35b, 63b which are offset at an angle and open into a common connecting passage 65.

As shown in FIG. 2, the first air-spring subassembly 100 is in released operative connection with the control element 37. The releasable operative connection consists of contact surfaces formed by the inside 19a of the outer tube 19 and an end face 67 of the control element 37. In the position shown in FIG. 2 reflects a lower than normal loading state of the air spring. In the lower than normal loading state, the operative connection between the control element 37 and the outer tube 19 is released.

When the transmission pin 51 is located at the reference point 102 in the central section $39b_1$ of the guideway 39, both control passages 35b, 63b are disengaged from the branch lines 35a, 63a, the control valve 15 is in the blocking position, and the outer tube 19 bears at the end against the end face 67 of the control element 37. Accordingly, the operative connection between the first air-spring subassembly 100 and the control element 37 is closed. During a relative movement between the first air-spring subassembly 100 and the second air spring subassembly 101, the movement of the control element 37 along the axial direction causes the transmission pin 51 of the control valve 15 to enter one of the sections $39b_2$ or $39b_4$ which are adjacent to the central section $39b_1$, which produces a rotary movement of the rotary-slide valve body 41 due to the radial offset $39a$ of the guideway 39. After the rotary movement of the rotary-slide valve body 41, one of the control passages 35b, 63b at least partly overlaps the respective one of the branch lines 35a, 63a. During a further change in load, the transmission pin 51 enters the end sections $39b_3$ and $39b_5$ and converted into a maximum transfer cross section of the rotary-slide valve body 41. When the transmission pin 51 enters the end sections $39b_3$, the compressed-air feed line 35 is fully opened via the branch line 35a. Conversely, when the transmission pin 51 enters the other end section $39b_5$ on account of the spring force of the spring element 43, the compressed-air feed line 35 is closed and the discharge line 63 is opened until the normal position in accordance with reference point 102 of the guideway 39 is set again. If the loading on the air spring 9 is reduced, the outer tube 19 lifts from the control element 37 (the control element 37 is held because the supporting surface 55 of the guideway 39 bears against the transmission pin 51. In this position of the control element 37, the rotary-slide valve is in the discharge operating position. For the control, it is completely irrelevant whether there is a small or larger gap between the outer tube 19 and the control element 37. In principle, the relationship is simply such that, if there is a gap between the two elements, air has to be discharged from the spring space 29. Therefore the end section $39b_5$ may be dimensioned to be markedly smaller than in the prior art such as in DE 44 09 252 C2. This saving in length is available for an axial shift of the position of the rolling tube 23 on the reservoir tube 27 toward the outer tube 19.

The control element 37 has means of preventing overmodulation of the control valve 15. The result of the axial length of each of the respective guide sections $39b_n$ is that no change in the transfer cross section occurs within these ranges of the stroke length, the maximum offset $39a$ being directly proportional to the transfer cross section. The relatively small offsets in the stroke-position region in sections $39b_4$ and $39b_5$ around the central section $39b_1$ of the guideway 39 dampen the control circuit.

The embodiments for damping the control circuit, due to their graduation, work such that the intended presetting of the stroke position is to be achieved as quickly as possible over the larger opening cross section. This provides a coarse control. As soon as the approximate presetting of the stroke position has been achieved, in which case a smaller opening cross section for the compressed air is set, a fine control which takes place at a slower rate effects the exact setting of the stroke position. As a result, the air consumption may be reduced. The gate 39' of the guideway 39 may of course also be of a stepless design, although the distinction between coarse control and fine control is to be retained.

Figure 7:
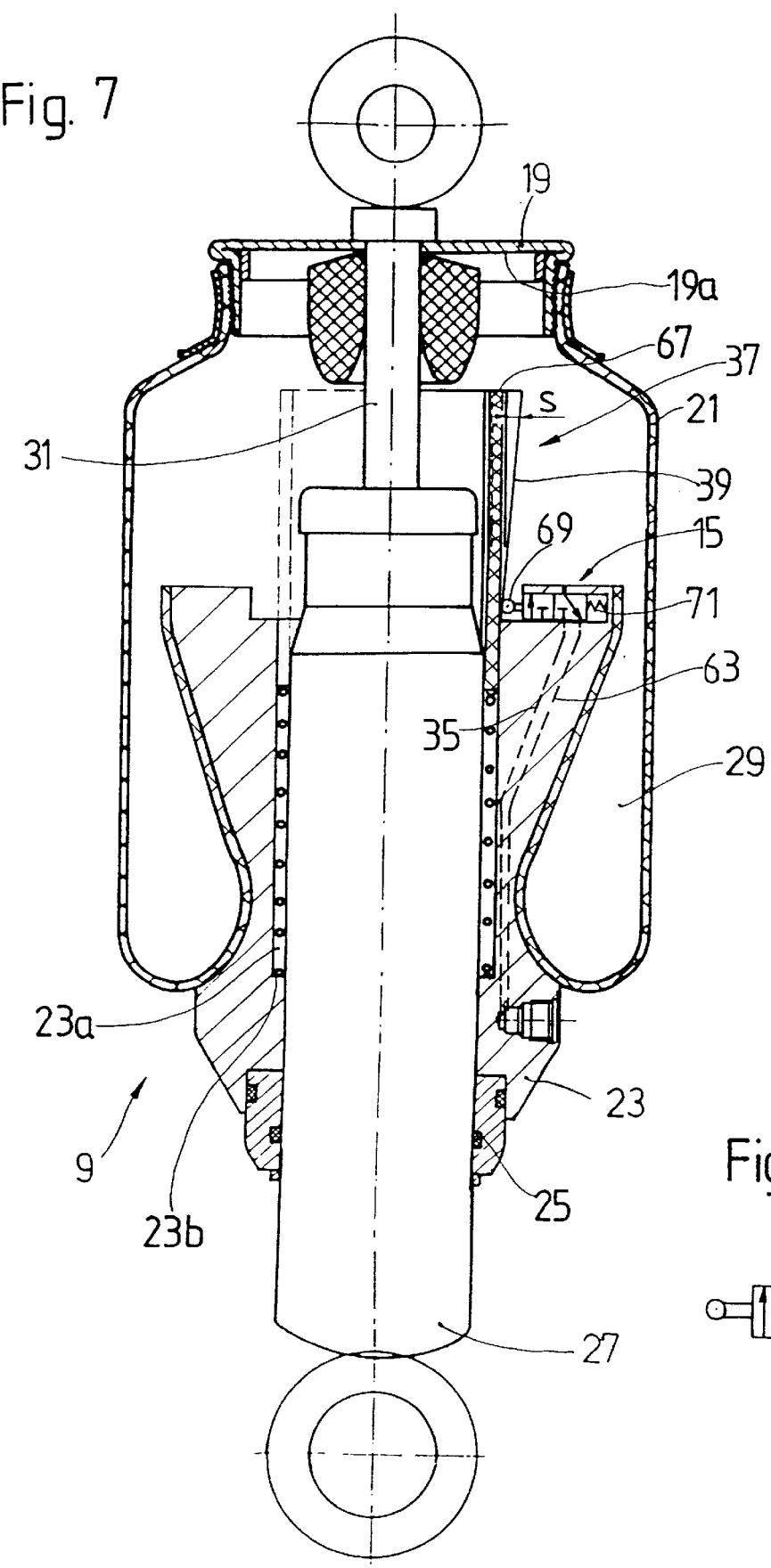
FIG. 7 is a sectional view of an air spring of the air suspension system of FIG. 1 with a control valve according to another embodiment of the present invention.
Figure 8:
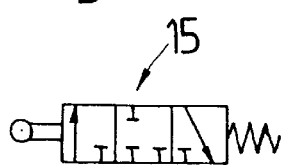
FIG. 8 is a schematic view of a 3/2-way control valve which may be used in the air spring of FIG. 7.

FIG. 7 shows an embodiment of an air spring $9a$ in which a control valve $15a$ which is adjustable in any desired manner is used. The control valve $15a$ is shown, for example, using a circuit symbol depicting a 3/2-way directional valve. However, any control valve in which a switching position which has simultaneously blocked discharge and compressed-air feed lines 35; 63 and is assumed in the region of the normal position of the stroke travel of the air spring may also be used. A function in the case of the compressed-air supply in accordance with the guideway profile according to FIG. 4 is thus achieved.

The control element $37a$ of this embodiment actuates a transmission member 69 which determines various switching positions of the control valve 15. A guideway $39a$ in the form of an inclined plane is made on the control element $37a$. A change in the stroke position of the control element $37a$ relative to the control valve $15a$ results in a change in the radial adjusting travels, starting from the guideway $39a$, on the transmission member 69. A return spring 71 provides for continuous contact between the transmission member 69 and the guideway $39a$ and thus exerts an adjusting force on the control valve $15a$ when the piston rod 31 of the air spring moves in the extension direction.

If the control element $37a$ in the region of the guideway $39a$ is designed as a cone, the adjusting travel s for the transmission member 69 is unaffected by a rotary movement of the control element $37a$ caused by vibrations. In that optional embodiment, no provisions at all need be made for an installation and operating position, oriented in the circumferential direction, of the control element $37a$ relative to the control valve $15a$.

The actuation of the control element $37a$ by the outer tube 19 via the end face 67 corresponds to the description in accordance with FIG. 2, the guideway $39a$ likewise having an effective length which corresponds approximately to half the stroke travel of the air spring 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An air-suspension system for use in a motor vehicle having a chassis and a vehicle component operatively mounted for moving along an oscillatory path relative to the chassis, said air-suspension system comprising:

an air spring connectable between the chassis and the vehicle component and comprising an outer tube air-spring subassembly and a rolling tube air-spring subassembly movable relative to the outer tube air-spring subassembly along a stroke length;

a control valve arranged inside the air-spring and having a compressed-air feed connection and a discharge connection, said control valve being selectively actuatable to a discharge position for discharging compressed air from said air spring via said discharge connection, a feed position for feeding compressed air to said air spring via said compressed-air feed connection, and a block position for blocking the flow of compressed air to and from said air spring; and a control element operatively arranged in said air spring for actuating said control valve in response to a relative position of said rolling tube air-spring subassembly and said outer tube air-spring tube assembly, wherein said control element comprises an effective length that is shorter than the stroke length of said air spring, and said control element is arranged in said rolling tube air spring subassembly and is axially movably arranged thereto; and a spring element arranged between said control element and a supporting surface of said rolling tube air-spring subassembly such that control element is movable toward said supporting surface of said rolling tube air-spring subassembly against an urgency of said spring element, wherein said control element is urged toward a releasable operative position relative to said rolling tube air-spring subassembly by said spring element.

2. The air-suspension system of claim 1, wherein said control element comprises a first contact surface and said rolling tube air-spring subassembly comprises a second contact surface, wherein said first contact surface abuts said second contact surface when said control element is in said releasable operative position.

3. The air-suspension system of claim 1, wherein said control valve comprises a rotary-slide valve and said control element is axially supported on said rotary-slide valve in one end position of said stroke length.

4. The air-suspension system of claim 1, wherein said control element comprises an anti-rotation locking means for preventing movement of the control element in a circumferential direction of said air spring.

5. The air-suspension system of claim 1, wherein said control element comprises a cylinder.

6. The air-suspension system of claim 1, wherein said control element comprises a pocket-shaped recess for receiving a guideway, wherein said guideway is operatively arranged for actuating said control valve.

7. The air-suspension system of claim 1, wherein said control element comprises a guideway for actuating said control valve made as one element with said control element.

* * * * *